(12) United States Patent
Mok et al.

(10) Patent No.: US 9,288,006 B1
(45) Date of Patent: *Mar. 15, 2016

(54) DEMULTIPLEXING HIGH-ORDER TO LOW-ORDER ODU SIGNALS IN AN OPTICAL TRANSPORT NETWORK

(71) Applicant: PMC-SIERRA US, INC., Sunnyvale, CA (US)

(72) Inventors: Winston Ki-Cheong Mok, Vancouver (CA); Somu Karuppan Chetty, Vancouver (CA); Jonathan Avey, Vancouver (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 13/837,798

(22) Filed: Mar. 15, 2013

Related U.S. Application Data

(60) Provisional application No. 61/704,259, filed on Sep. 21, 2012.

(51) Int. Cl.
*H04J 14/00* (2006.01)
*H04J 14/02* (2006.01)

(52) U.S. Cl.
CPC .............. *H04J 14/00* (2013.01); *H04J 14/025* (2013.01)

(58) Field of Classification Search
None
See application file for complete search history.

(56) References Cited

U.S. PATENT DOCUMENTS

| | | | |
|---|---|---|---|
| 7,782,843 B2 | 8/2010 | Zou et al. | |
| 8,170,421 B2 | 5/2012 | Li | |
| 8,638,683 B2 | 1/2014 | Honma et al. | |
| 8,731,398 B2 | 5/2014 | Akiyama et al. | |
| 8,774,640 B2 | 7/2014 | Xiao et al. | |
| 2003/0202545 A1* | 10/2003 | Arbel et al. | 370/539 |
| 2007/0076769 A1 | 4/2007 | Zou | |
| 2011/0170864 A1 | 7/2011 | Tani et al. | |
| 2012/0002965 A1 | 1/2012 | Bellato et al. | |
| 2012/0014270 A1 | 1/2012 | Honma et al. | |
| 2012/0170936 A1* | 7/2012 | Vissers et al. | 398/58 |
| 2012/0230350 A1* | 9/2012 | Katagiri et al. | 370/474 |
| 2013/0004169 A1 | 1/2013 | Mohamad et al. | |
| 2013/0315592 A1 | 11/2013 | Sharma et al. | |
| 2014/0193146 A1* | 7/2014 | Lanzone et al. | 398/2 |

OTHER PUBLICATIONS

USPTO Office Action for U.S. Appl. No. 13/835,443 dated Sep. 19, 2014, 13 pages.
International Telecommunications Union, "Characteristics of optical transport network hierarchy equipment functional blocks," ITU-T Recommendation G.798, Telecommunication Standardization Sector of ITU, 397 pages, Dec. 2012.

(Continued)

*Primary Examiner* — Christine Duong
(74) *Attorney, Agent, or Firm* — Dennis R. Haszko

(57) ABSTRACT

A method and apparatus are provided for de-multiplexing one or more Low-Order ODUj/ODUflex clients from a High-Order ODUk carrier. The number of TribSlots assigned to an ODUflex may be increased and decreased hitlessly, in accordance to ITU-T G.7044. In the Multiplexing direction, a Space-Time-Space switch is used to interleave bytes from Low-Order ODUk words into High-Order ODUk words. In the De-multiplexing direction, a similar switch is used to extract Low-Order ODUj bytes that are interleaved inside High-Order ODUk words and re-arrange them into Low-Order ODUj words.

22 Claims, 22 Drawing Sheets

(56) References Cited

OTHER PUBLICATIONS

International Telecommunications Union, "Interfaces for the Optical Transport Network (OTN)," ITU-T Recommendation G.709/Y.1331, Telecommunication Standardization Sector of ITU, 232 pages, Feb. 2012.

International Telecommunications Union, "Hitless Adjustment of ODUflex (GFP) (HAO)," ITU-T Recommendation G.7044/Y1347, Telecommunication Standardization Sector of ITU, 32 pages, Oct. 2011.

International Telecommunications Union, "Transport of IEEE 10GBASE-R in optical transport networks (OTN)," Supplement 43 to ITU-T G-series Recommendation, Telecommunication Standardization Sector of ITU, 27 pages, Feb. 2011.

U.S. Appl. No. 13/835,443, Notice of Allowance dated Mar. 11, 2015.

\* cited by examiner

| MFAS (678) | MF Row | Frame Row | PL Row 1 | ............ | 15 | 16 | 1 17 |
|---|---|---|---|---|---|---|---|
| "000" | 1 | 1 | | | TSOH A | TS1 A 1.25G | A1 |
| | 2 | 2 | | | | | A476 |
| | 3 | 3 | | | | | A951 |
| | 4 | 4 | | | | | A1426 |
| "001" | 5 | 1 | | | TSOH B | TS2 B 1.25G | A1901 |
| | 6 | 2 | | | | | A2376 |
| | 7 | 3 | | | | | A2851 |
| | 8 | 4 | | | | | A3326 |
| "010" | 9 | 1 | | | TSOH | TS2 C 1.25G | A3801 |
| | 10 | 2 | | | | | A4276 |
| | 11 | 3 | | | | | A4751 |
| | 12 | 4 | | | | | A5226 |
| "011" | 13 | 1 | | | TSOH | TS4 C 1.25G | A5701 |
| | 14 | 2 | | | | | A6176 |
| | 15 | 3 | | | | | A6651 |
| | 16 | 4 | | | | | A7126 |
| "100" | 17 | 1 | | | TSOH B | TS5 B 1.25G | A7601 |
| | 18 | 2 | | | | | A8076 |
| | 19 | 3 | | | | | A8551 |
| | 20 | 4 | | | | | A9026 |
| "101" | 21 | 1 | | | TSOH | TS2 C 1.25G | A9501 |
| | 22 | 2 | | | | | A9976 |
| | 23 | 3 | | | | | A10451 |
| | 24 | 4 | | | | | A10926 |
| "110" | 25 | 1 | | | TSOH | TS7 C 1.25G | A11401 |
| | 26 | 2 | | | | | A11876 |
| | 27 | 3 | | | | | A12351 |
| | 28 | 4 | | | | | A12826 |
| "111" | 29 | 1 | | | TSOH C | TS8 C 1.25G | A13301 |
| | 30 | 2 | | | | | A13776 |
| | 31 | 3 | | | | | A14251 |
| | 32 | 4 | | | | | A14726 |

FIG. 3A

| 2 | 3 | 4 | 5 | 6 | 7 | 8 | |
|---|---|---|---|---|---|---|---|
| 18 | 19 | 20 | 21 | 22 | 23 | 24 | ............... |
| B1 | C1 | C2 | B2 | C3 | C4 | C5 | |
| B953 | C2381 | C2382 | B954 | C2383 | C2384 | C2385 | |
| B1905 | C4761 | C4762 | B1906 | C4763 | C4764 | C4765 | ............... |
| B2857 | C7141 | C7142 | B2858 | C7143 | C7144 | C7145 | |
| B3809 | C9521 | C9522 | B3810 | C9523 | C9524 | C9525 | |
| B4761 | C11901 | C11902 | B4762 | C11903 | C11904 | C11905 | ............... |
| B5713 | C14281 | C14282 | B5714 | C14283 | C14284 | C14285 | |
| B6665 | C16661 | C16662 | B6666 | C16663 | C16664 | C16665 | |
| B7617 | C19041 | C19042 | B7618 | C19043 | C19044 | C19045 | |
| B8569 | C21421 | C21422 | B8570 | C21423 | C21424 | C21425 | ............... |
| B9521 | C23801 | C23802 | B9522 | C23803 | C23804 | C23805 | |
| B10473 | C26181 | C26182 | B10474 | C26183 | C26184 | C26185 | |
| B11425 | C28561 | C28562 | B11426 | C28563 | C28564 | C28565 | |
| B12377 | C30941 | C30942 | B12378 | C30943 | C30944 | C30945 | ............... |
| B13329 | C33321 | C33322 | B13330 | C33323 | C33324 | C33325 | |
| B14281 | C35701 | C35702 | B14282 | C35703 | C35704 | C35705 | |
| B15233 | C38081 | C38082 | B15234 | C38083 | C38084 | C38085 | |
| B16185 | C40461 | C40462 | B16186 | C40463 | C40464 | C40465 | ............... |
| B17137 | C42841 | C42842 | B17138 | C42843 | C42844 | C42845 | |
| B18089 | C45221 | C45222 | B18090 | C45223 | C45224 | C45225 | |
| B19041 | C47601 | C47602 | B19042 | C47603 | C47604 | C47605 | |
| B19993 | C49981 | C49982 | B19994 | C49983 | C49984 | C49985 | ............... |
| B20945 | C52361 | C52362 | B20946 | C52363 | C52364 | C52365 | |
| B21897 | C54741 | C54742 | B21898 | C54743 | C54744 | C54745 | |
| B22849 | C57121 | C57122 | B22850 | C57123 | C57124 | C57125 | |
| B23801 | C59501 | C59502 | B23802 | C59503 | C59504 | C59505 | ............... |
| B24753 | C61881 | C61882 | B24754 | C61883 | C61884 | C61885 | |
| B25705 | C64261 | C64262 | B25706 | C64263 | C64264 | C64265 | |
| B26657 | C66641 | C66642 | B26658 | C66643 | C66644 | C66645 | |
| B27609 | C69021 | C69022 | B27610 | C69023 | C69024 | C69025 | ............... |
| B28561 | C71401 | C71402 | B28562 | C71403 | C71404 | C71405 | |
| B29513 | C73781 | C73782 | B29514 | C73783 | C73784 | C73785 | |

FIG. 3B

| 1 | 2 | 3 | 4 | 5 | 6 | 7 | 8 |
|---|---|---|---|---|---|---|---|
| A1(1) | A2(1) | A3(1) | A4(1) | A5(1) | A6(1) | A7(1) | A8(1) |
| A477(1) | A478(1) | A479(1) | A480(1) | A481(1) | A482(1) | A483(1) | A484(1) |
| A953(1) | A954(1) | A955(1) | A956(1) | A957(1) | A958(1) | A959(1) | A960(1) |
| A1429(1) | A1430(1) | A1431(1) | A1432(1) | A1433(1) | A1434(1) | A1435(1) | A1436(1) |
| ... | | | | | | | |
| A13329(1) | A13330(1) | A13331(1) | A13332(1) | A13333(1) | A13334(1) | A13335(1) | A13336(1) |
| A13805(1) | A13806(1) | A13807(1) | A13808(1) | A13809(1) | A13810(1) | A13811(1) | A13812(1) |
| A14281(1) | A14282(1) | A14283(1) | A14284(1) | A14285(1) | A14286(1) | A14287(1) | A14288(1) |
| A14757(1) | A14758(1) | A14759(1) | A14760(1) | A14761(1) | A14762(1) | A14763(1) | A14764(1) |

FIG. 4

| | 1 | 2 | 3 | 4 | 5 | 6 | 7 | 8 | |
|---|---|---|---|---|---|---|---|---|---|
| | B1(1) | B1(2) | B2(1) | B2(2) | B3(1) | B3(2) | B4(1) | B4(2) | ... |
| | B477(1) | B477(2) | B478(1) | B478(2) | B479(1) | B479(2) | B480(1) | B480(2) | ... |
| | B953(1) | B953(2) | B954(1) | B954(2) | B955(1) | B955(2) | B956(1) | B956(2) | ... |
| | B1429(1) | B1429(2) | B1430(1) | B1430(2) | B1431(1) | B1431(2) | B1432(1) | B1432(2) | ... |
| | | | | | | | | | |
| | B13329(1) | B13329(2) | B13330(1) | B13330(2) | B13331(1) | B13331(2) | B13332(1) | B13332(2) | |
| | B13805(1) | B13805(2) | B13806(1) | B13806(2) | B13807(1) | B13807(2) | B13808(1) | B13808(2) | |
| | B14281(1) | B14281(2) | B14282(1) | B14282(2) | B14283(1) | B14283(2) | B14284(1) | B14284(2) | |
| | B14757(1) | B14757(2) | B14758(1) | B14758(2) | B14759(1) | B14759(2) | B14760(1) | B14760(2) | |

FIG. 5

| | 1 | 2 | 3 | 4 | 5 | 6 | 7 | 8 | |
|---|---|---|---|---|---|---|---|---|---|
| | C1(1) | C1(2) | C1(3) | C1(4) | C1(5) | C2(1) | C2(2) | C2(3) | |
| | C477(1) | C477(2) | C477(3) | C477(4) | C477(5) | C478(1) | C478(2) | C478(3) | |
| | C953(1) | C953(2) | C953(3) | C953(4) | C953(5) | C954(1) | C954(2) | C954(3) | |
| | C1429(1) | C1429(2) | C1429(3) | C1429(4) | C1429(5) | C1430(1) | C1430(2) | C1430(3) | |
| | | | | | ...... | | | | |
| | C13329(1) | C13329(2) | C13329(3) | C13329(4) | C13329(5) | C13330(1) | C13330(2) | C13330(3) | |
| | C13805(1) | C13805(2) | C13805(3) | C13805(4) | C13805(5) | C13806(1) | C13806(2) | C13806(3) | |
| | C14281(1) | C14281(2) | C14281(3) | C14281(4) | C14281(5) | C14282(1) | C14282(2) | C14282(3) | |
| | C14757(1) | C14757(2) | C14757(3) | C14757(4) | C14757(5) | C14758(1) | C14758(2) | C14758(3) | |

FIG. 6

| Cycle<br>Byte | 0 | 1 | 2 | 3 | 4 | 5 | 6 | 7 | |
|---|---|---|---|---|---|---|---|---|---|
| 47 | A1(1) | A7(1) | A13(1) | A19(1) | A25(1) | A31(1) | A37(1) | A43(1) | |
| 46 | B1(1) | B7(1) | B13(1) | B19(1) | B25(1) | B31(1) | B37(1) | B43(1) | |
| 45 | C1(1) | C7(1) | C13(1) | C19(1) | C25(1) | C31(1) | C37(1) | C43(1) | |
| 44 | C1(2) | C7(2) | C13(2) | C19(2) | C25(2) | C31(2) | C37(2) | C43(2) | |
| 43 | B1(2) | B6(2) | B12(2) | B18(2) | B24(2) | B30(2) | B36(2) | B42(2) | |
| 42 | C1(3) | C7(3) | C13(3) | C19(3) | C25(3) | C31(3) | C37(3) | C43(3) | |
| 41 | C1(4) | C7(4) | C13(4) | C19(4) | C25(4) | C31(4) | C37(4) | C43(4) | |
| 40 | C1(5) | C7(5) | C13(5) | C19(5) | C25(5) | C31(5) | C37(5) | C43(5) | |
| 39 | A2(1) | A8(1) | A14(1) | A20(1) | A26(1) | A32(1) | A38(1) | A44(1) | |
| 38 | B2(1) | B8(1) | B14(1) | B20(1) | B26(1) | B32(1) | B38(1) | B44(1) | |
| 37 | C2(1) | C8(1) | C14(1) | C20(1) | C26(1) | C32(1) | C38(1) | C44(1) | |
| 36 | C2(2) | C8(2) | C14(2) | C20(2) | C26(2) | C32(2) | C38(2) | C44(2) | |
| 35 | B2(2) | B6(2) | B12(2) | B18(2) | B24(2) | B30(2) | B36(2) | B42(2) | |
| 34 | C2(3) | C8(3) | C14(3) | C20(3) | C26(3) | C32(3) | C38(3) | C44(3) | |
| 33 | C2(4) | C8(4) | C14(4) | C20(4) | C26(4) | C32(4) | C38(4) | C44(4) | |
| 32 | C2(5) | C8(5) | C14(5) | C20(5) | C26(5) | C32(5) | C38(5) | C44(5) | |
| 31 | A3(1) | A9(1) | A15(1) | A21(1) | A27(1) | A33(1) | A39(1) | A45(1) | |
| 30 | B3(1) | B9(1) | B15(1) | B21(1) | B27(1) | B33(1) | B39(1) | B45(1) | |
| 29 | C3(1) | C9(1) | C15(1) | C21(1) | C27(1) | C33(1) | C39(1) | C45(1) | |
| 28 | C3(2) | C9(2) | C15(2) | C21(2) | C27(2) | C33(2) | C39(2) | C45(2) | |
| 27 | B3(2) | B6(2) | B12(2) | B18(2) | B24(2) | B30(2) | B36(2) | B42(2) | |
| 26 | C3(3) | C9(3) | C15(3) | C21(3) | C27(3) | C33(3) | C39(3) | C45(3) | |
| 25 | C3(4) | C9(4) | C15(4) | C21(4) | C27(4) | C33(4) | C39(4) | C45(4) | |
| 24 | C3(5) | C9(5) | C15(5) | C21(5) | C27(5) | C33(5) | C39(5) | C45(5) | |
| 23 | A4(1) | A10(1) | A16(1) | A22(1) | A28(1) | A34(1) | A40(1) | A46(1) | |
| 22 | B4(1) | B10(1) | B16(1) | B22(1) | B28(1) | B34(1) | B40(1) | B46(1) | |
| 21 | C4(1) | C10(1) | C16(1) | C22(1) | C28(1) | C34(1) | C40(1) | C46(1) | |
| 20 | C4(2) | C10(2) | C16(2) | C22(2) | C28(2) | C34(2) | C40(2) | C46(2) | |
| 19 | B4(2) | B6(2) | B12(2) | B18(2) | B24(2) | B30(2) | B36(2) | B42(2) | |
| 18 | C4(3) | C10(3) | C16(3) | C22(3) | C28(3) | C34(3) | C40(3) | C46(3) | |
| 17 | C4(4) | C10(4) | C16(4) | C22(4) | C28(4) | C34(4) | C40(4) | C46(4) | |
| 16 | C4(5) | C10(5) | C16(5) | C22(5) | C28(5) | C34(5) | C40(5) | C46(5) | |
| 15 | A5(1) | A11(1) | A17(1) | A23(1) | A29(1) | A35(1) | A41(1) | A47(1) | |
| 14 | B5(1) | B11(1) | B17(1) | B23(1) | B29(1) | B35(1) | B41(1) | B47(1) | |
| 13 | C5(1) | C11(1) | C17(1) | C23(1) | C29(1) | C35(1) | C41(1) | C47(1) | |
| 12 | C5(2) | C11(2) | C17(2) | C23(2) | C29(2) | C35(2) | C41(2) | C47(2) | |
| 11 | B5(2) | B6(2) | B12(2) | B18(2) | B24(2) | B30(2) | B36(2) | B42(2) | |
| 10 | C5(3) | C11(3) | C17(3) | C23(3) | C29(3) | C35(3) | C41(3) | C47(3) | |
| 9 | C5(4) | C11(4) | C17(4) | C23(4) | C29(4) | C35(4) | C41(4) | C47(4) | |
| 8 | C5(5) | C11(5) | C17(5) | C23(5) | C29(5) | C35(5) | C41(5) | C47(5) | |
| 7 | A6(1) | A12(1) | A18(1) | A24(1) | A30(1) | A36(1) | A42(1) | A48(1) | |
| 6 | B6(1) | B12(1) | B18(1) | B24(1) | B30(1) | B36(1) | B42(1) | B48(1) | |
| 5 | C6(1) | C12(1) | C18(1) | C24(1) | C30(1) | C36(1) | C42(1) | C48(1) | |
| 4 | C6(2) | C12(2) | C18(2) | C24(2) | C30(2) | C36(2) | C42(2) | C48(2) | |
| 3 | B6(2) | B6(2) | B12(2) | B18(2) | B24(2) | B30(2) | B36(2) | B42(2) | |
| 2 | C6(3) | C12(3) | C18(3) | C24(3) | C30(3) | C36(3) | C42(3) | C48(3) | |
| 1 | C6(4) | C12(4) | C18(4) | C24(4) | C30(4) | C36(4) | C42(4) | C48(4) | |
| 0 | C6(5) | C12(5) | C18(5) | C24(5) | C30(5) | C36(5) | C42(5) | C48(5) | |

FIG. 11

| Cycle<br>Byte | 2536 | 2537 | 2538 | 2539 | 2540 | 2541 | 2542 | 2543 |
|---|---|---|---|---|---|---|---|---|
| 47 | A15217(1) | B15217(1) | C15217(1) | C15226(4) | | | | |
| 46 | A15218(1) | B15217(2) | C15217(2) | C15226(5) | | | | |
| 45 | A15219(1) | B15218(1) | C15217(3) | C15227(1) | | | | |
| 44 | A15220(1) | B15218(2) | C15217(4) | C15227(2) | | | | |
| 43 | A15221(1) | B15219(1) | C15217(5) | C15227(3) | | | | |
| 42 | A15222(1) | B15219(1) | C15218(1) | C15227(4) | | | | |
| 41 | A15223(1) | B15220(2) | C15218(2) | C15227(5) | | | | |
| 40 | A15224(1) | B15220(1) | C15218(3) | C15228(1) | | | | |
| 39 | A15225(1) | B15221(2) | C15218(4) | C15228(2) | | | | |
| 38 | A15226(1) | B15221(1) | C15218(5) | C15228(3) | | | | |
| 37 | A15227(1) | B15222(1) | C15219(1) | C15228(4) | | | | |
| 36 | A15228(1) | B15222(2) | C15219(2) | C15228(5) | | | | |
| 35 | A15229(1) | B15223(1) | C15219(3) | C15229(1) | | | | |
| 34 | A15230(1) | B15223(2) | C15219(4) | C15229(2) | | | | |
| 33 | A15231(1) | B15224(1) | C15219(5) | C15229(3) | | | | |
| 32 | A15232(1) | B15224(1) | C15220(1) | C15229(4) | | | | |
| 31 | | B15225(2) | C15220(2) | C15229(5) | | | | |
| 30 | | B15225(1) | C15220(3) | C15230(1) | | | | |
| 29 | | B15226(2) | C15220(4) | C15230(2) | | | | |
| 28 | | B15226(1) | C15220(5) | C15230(3) | | | | |
| 27 | | B15227(1) | C15221(1) | C15230(4) | | | | |
| 26 | | B15227(2) | C15221(2) | C15230(5) | | | | |
| 25 | | B15228(1) | C15221(3) | C15231(1) | | | | |
| 24 | | B15228(2) | C15221(4) | C15231(2) | | | | |
| 23 | | B15229(1) | C15221(5) | C15231(3) | | | | |
| 22 | | B15229(1) | C15222(1) | C15231(4) | | | | |
| 21 | | B15230(2) | C15222(2) | C15231(5) | | | | |
| 20 | | B15230(1) | C15222(3) | C15232(1) | | | | |
| 19 | | B15231(2) | C15222(4) | C15232(2) | | | | |
| 18 | | B15231(1) | C15222(5) | C15232(3) | | | | |
| 17 | | B15232(1) | C15223(1) | C15232(4) | | | | |
| 16 | | B15232(2) | C15223(2) | C15232(5) | | | | |
| 15 | | | C15223(3) | | | | | |
| 14 | | | C15223(4) | | | | | |
| 13 | | | C15223(5) | | | | | |
| 12 | | | C15224(1) | | | | | |
| 11 | | | C15224(2) | | | | | |
| 10 | | | C15224(3) | | | | | |
| 9 | | | C15224(4) | | | | | |
| 8 | | | C15224(5) | | | | | |
| 7 | | | C15225(1) | | | | | |
| 6 | | | C15225(2) | | | | | |
| 5 | | | C15225(3) | | | | | |
| 4 | | | C15225(4) | | | | | |
| 3 | | | C15225(5) | | | | | |
| 2 | | | C15226(1) | | | | | |
| 1 | | | C15226(2) | | | | | |
| 0 | | | C15226(3) | | | | | |

FIG. 12

| Address RAM | 0 | 1 | 2 | 3 | 4 | 5 | 6 | 7 |
|---|---|---|---|---|---|---|---|---|
| 94 | | | | | | | | |
| 93 | | | | | | | | |
| 92 | | | | | | | | |
| 91 | | | | | | | | |
| 90 | | | | | | | | |
| 89 | | | | C16(2).2 | B45(1).7 | | C30(4).4 | C46(3).7 |
| 88 | | | | C16(1).2 | B44(2).7 | | C30(3).4 | C46(2).7 |
| 87 | | | | C15(5).2 | B44(1).7 | | C30(2).4 | C46(1).7 |
| 86 | | | | C15(4).2 | B43(2).7 | | C30(1).4 | C45(5).7 |
| 85 | | | | C15(3).2 | B43(1).7 | | C29(5).4 | C45(4).7 |
| 84 | | | | C15(2).2 | B42(2).6 | C29(4).4 | | C45(3).7 |
| 83 | | | | C15(1).2 | B42(1).6 | C29(3).4 | | C45(2).7 |
| 82 | | | | C14(5).2 | B41(2).6 | C29(2).4 | | C45(1).7 |
| 81 | | | | C14(4).2 | B41(1).6 | C29(1).4 | | C44(5).7 |
| 80 | | | | C14(3).2 | B40(2).6 | C28(5).4 | | C44(4).7 |
| 79 | | | | C14(2).2 | B40(1).6 | C28(4).4 | | C44(3).7 |
| 78 | | | | C14(1).2 | B39(2).6 | C28(3).4 | | C44(2).7 |
| 77 | | | | C13(5).2 | B39(1).6 | C28(2).4 | | C44(1).7 |
| 76 | | | | C13(4).2 | B38(2).6 | C28(1).4 | | C43(5).7 |
| 75 | | | | C13(3).2 | B38(1).6 | C27(5).4 | | C43(4).7 |
| 74 | | | | C13(2).2 | B37(2).6 | C27(4).4 | | C43(3).7 |
| 73 | | | | C13(1).2 | B37(1).6 | C27(3).4 | | C43(2).7 |
| 72 | | | | C12(5).1 | B36(2).5 | C27(2).4 | | C43(1).7 |
| 71 | | | | C12(4).1 | B36(1).5 | C27(1).4 | | C42(5).6 |
| 70 | | | | C12(3).1 | B35(2).5 | C26(5).4 | | C42(4).6 |
| 69 | | | | C12(2).1 | B35(1).5 | C26(4).4 | | C42(3).6 |
| 68 | | | | C12(1).1 | B34(2).5 | C26(3).4 | | C42(2).6 |
| 67 | | | | C11(5).1 | B34(1).5 | C26(2).4 | | C42(1).6 |
| 66 | | | | C11(4).1 | B33(2).5 | C26(1).4 | | C41(5).6 |
| 65 | | | C10(3).1 | C11(3).1 | B33(1).5 | C25(5).4 | | C41(4).6 |
| 64 | | | C10(2).1 | C11(2).1 | B32(2).5 | C25(4).4 | | C41(3).6 |
| 63 | | | C10(1).1 | C11(1).1 | B32(1).5 | C25(3).4 | | C41(2).6 |
| 62 | | | C9(5).1 | C10(5).1 | B31(2).5 | C25(2).4 | | C41(1).6 |
| 61 | | | C9(4).1 | C10(4).1 | B31(1).5 | C25(1).4 | | C40(5).6 |
| 60 | | | C9(3).1 | | B30(2).4 | C24(5).3 | | C40(4).6 |
| 59 | | | C9(2).1 | | B30(1).4 | C24(4).3 | | C40(3).6 |
| 58 | | | C9(1).1 | | B29(2).4 | C24(3).3 | | C40(2).6 |
| 57 | | | C8(5).1 | | B29(1).4 | C24(2).3 | | C40(1).6 |
| 56 | | | C8(4).1 | | B28(2).4 | C24(1).3 | | C39(5).6 |
| 55 | | | C8(3).1 | | B28(1).4 | C23(5).3 | | C39(4).6 |
| 54 | | | C8(2).1 | | B27(2).4 | C23(4).3 | | C39(3).6 |
| 53 | | B24(2).3 | C8(1).1 | | B27(1).4 | C23(3).3 | C39(2).6 | |
| 52 | | B24(1).3 | C7(5).1 | | B26(2).4 | C23(2).3 | C39(1).6 | |
| 51 | | B23(2).3 | C7(4).1 | | B26(1).4 | C23(1).3 | C38(5).6 | |

| | A | B | C | | C | | |
|---|---|---|---|---|---|---|---|
| 33 | A | | | | | | |
| 32 | A | | | | | | |
| 31 | A15232(1).5 | B15214(2).2 | C15204(1).0 | | | C15220(5).3 | |
| 30 | A15231(1).5 | B15214(1).2 | C15203(5).0 | | | C15220(4).3 | |
| 29 | A15230(1).4 | B15213(2).2 | C15203(4).0 | | | C15220(3).2 | |
| 28 | A15229(1).4 | B15213(1).2 | C15203(3).0 | C15220(1).3 | | C15220(2).3 | |
| 27 | A15228(1).4 | B15212(2).1 | C15203(2).0 | C15219(5).3 | | | |
| 26 | A15227(1).4 | B15212(1).1 | C15203(1).0 | C15219(4).3 | | | |
| 25 | A15226(1).4 | B15211(2).1 | C15202(5).0 | C15219(3).3 | | | |
| 24 | A15225(1).4 | B15211(1).1 | C15202(4).0 | C15219(2).3 | | | |
| 23 | A15224(1).3 | B15210(2).1 | C15202(3).0 | C15219(1).3 | | | |
| 22 | A15223(1).3 | B15210(1).1 | C15202(2).0 | | | | |
| 21 | A15222(1).3 | B15209(2).1 | C15202(1).0 | | | | |
| 20 | A15221(1).3 | B15209(1).1 | C15201(5).0 | | | | |
| 19 | A15220(1).3 | B15208(2).1 | C15201(4).0 | | | | |
| 18 | A15219(1).3 | B15208(1).1 | C15201(3).0 | C15218(5).2 | | | |
| 17 | A15218(1).2 | B15207(2).1 | C15201(2).0 | | | | |
| 16 | A15217(1).2 | B15207(1).1 | C15201(1).0 | | | | |
| 15 | A15216(1).2 | B15206(2).0 | | | | | |
| 14 | A15215(1).2 | B15206(1).0 | | | | | |
| 13 | A15214(1).2 | B15205(2).0 | | | | | |
| 12 | A15213(1).2 | B15205(1).0 | | | | | |
| 11 | A15212(1).1 | B15204(2).0 | | C15218(4).2 | | | |
| 10 | A15211(1).1 | B15204(1).0 | | C15218(3).2 | | | |
| 9 | A15210(1).1 | B15203(2).0 | | C15218(2).2 | | C15232(5).5 | C |
| 8 | A15209(1).1 | B15203(1).0 | | C15218(1).2 | | C15232(4).5 | C |
| 7 | A15208(1).1 | B15202(2).0 | | C15217(5).2 | | C15232(3).5 | C |
| 6 | A15207(1).1 | B15202(1).0 | | C15217(4).2 | B | C15232(2).5 | C |
| 5 | A15206(1).0 | B15201(2).0 | | C15217(3).2 | B | C15232(1).5 | C |
| 4 | A15205(1).0 | B15201(1).0 | | C15217(2).2 | B | C15231(5).5 | C |
| 3 | A15204(1).0 | | | C15217(1).2 | B | C15231(4).5 | C |
| 2 | A15203(1).0 | | | C15216(5).2 | B | C15231(3).5 | C |
| 1 | A15202(1).0 | | | C15216(4).2 | B | C15231(2).5 | C |
| 0 | A15201(1).0 | | | C15216(3).2 | B | C15231(1).5 | C |
| | A | B | C | C | B | C | C |

FIG. 15A

| Row | A | B15xxx | C15xxx | C15210 | B152xx | C152xx | shaded1 | shaded2 |
|---|---|---|---|---|---|---|---|---|
| 66 | | | | | | | | C |
| 65 | | | | | | | | C |
| 64 | | | | | | | | C |
| 63 | | | | | | | | C |
| 62 | | | | | | | | C |
| 61 | | | | | | | | C |
| 60 | | | | | | | | C |
| 59 | | | | | | | | C |
| 58 | | | | | | | | C |
| 57 | | | | | | | | C |
| 56 | | | | | | | | C |
| 55 | | | | | | | | |
| 54 | | | | | | | | |
| 53 | | B15224(2).3 | | C15210(4).1 | B15231(1).5 | C15225(1).4 | | |
| 52 | | B15224(1).3 | C15210(3).1 | | B15230(2).4 | C15224(5).3 | | |
| 51 | | B15223(2).3 | C15210(2).1 | | B15230(1).4 | C15224(4).3 | | |
| 50 | | B15223(1).3 | C15210(1).1 | | B15229(2).4 | C15224(3).3 | | |
| 49 | | B15222(2).3 | C15209(5).1 | | B15229(1).4 | C15224(2).3 | | |
| 48 | | B15222(1).3 | C15209(4).1 | | B15228(2).4 | C15224(1).3 | | |
| 47 | A | B15221(2).3 | C15209(3).1 | | B15228(1).4 | C15223(5).3 | | |
| 46 | A | B15221(1).3 | C15209(2).1 | | B15227(2).4 | C15223(4).3 | | |
| 45 | A | B15220(2).3 | C15209(1).1 | | B15227(1).4 | C15223(3).3 | | |
| 44 | A | B15220(1).3 | C15208(5).1 | | B15226(2).4 | C15223(2).3 | | |
| 43 | A | B15219(2).3 | C15208(4).1 | | B15226(1).4 | C15223(1).3 | | |
| 42 | A | B15219(1).3 | C15208(3).1 | | B15225(2).4 | C15222(5).3 | | |
| 41 | A | B15218(2).2 | C15208(2).1 | | B15225(1).4 | C15222(4).3 | | |
| 40 | A | B15218(1).2 | C15207(5).1 | | | | C | |
| 39 | A | B15217(2).2 | C15207(4).1 | | | | C | C15222(3).3 |
| 38 | A | B15217(1).2 | C15207(3).1 | | | | C | C15222(2).3 |
| 37 | A | B15216(2).2 | C15207(2).1 | | | | C | C15222(1).3 |
| 36 | A | B15216(1).2 | C15207(1).1 | | | | C | C15221(5).3 |
| 35 | A | B15215(2).2 | C15206(5).0 | | | | C | C15221(4).3 |
| 34 | A | B15215(1).2 | C15206(4).0 | | | | C | C15221(3).3 |

FIG. 15B

| Address RAM | 0 | 1 | 2 | 3 | 4 | 5 | 6 | 7 |
|---|---|---|---|---|---|---|---|---|
| 94 | | | | C15216(2).2 | B | | C15230(4).4 | |
| 93 | | | | C15216(1).2 | B | | C15230(3).4 | |
| 92 | | | | C15215(5).2 | B | | C15230(2).4 | |
| 91 | | | | C15215(4).2 | B | | C15230(1).4 | |
| 90 | | | | C15215(3).2 | B | | C15229(5).4 | |
| 89 | | | | C15215(2).2 | B | C15229(4).4 | | U |
| 88 | | | | C15215(1).2 | B | C15229(3).4 | | U |
| 87 | | | | C15214(5).2 | B | C15229(2).4 | | U |
| 86 | | | | C15214(4).2 | B | C15229(1).4 | | U |
| 85 | | | | C15214(3).2 | B | C15228(5).4 | | U |
| 84 | | | | C15214(2).2 | B | C15228(4).4 | | U |
| 83 | | | | C15214(1).2 | B | C15228(3).4 | | U |
| 82 | | | | C15213(5).2 | B | C15228(2).4 | | U |
| 81 | | | | C15213(4).2 | B | C15228(1).4 | | U |
| 80 | | | | C15213(3).2 | B | C15227(5).4 | | U |
| 79 | | | | C15213(2).2 | B | C15227(4).4 | | U |
| 78 | | | | C15213(1).2 | B | C15227(3).4 | | U |
| 77 | | | | C15212(5).1 | B | C15227(2).4 | | U |
| 76 | | | | C15212(4).1 | B | C15227(1).4 | | U |
| 75 | | | | C15212(3).1 | B | C15226(5).4 | | U |
| 74 | | | | C15212(2).1 | B | C15226(4).4 | | U |
| 73 | | | | C15212(1).1 | B | C15226(3).4 | | U |
| 72 | | | | C15211(5).1 | B | C15226(2).4 | | U |
| 71 | | | | C15211(4).1 | B | C15226(1).4 | | U |
| 70 | | | | C15211(3).1 | B | C15225(5).4 | | U |
| 69 | | | | C15211(2).1 | B15232(2).5 | C15225(4).4 | | U |
| 68 | | | | C15211(1).1 | B15232(1).5 | C15225(3).4 | | U |
| 67 | | | | C15210(5).1 | B15231(2).5 | C15225(2).4 | | U |

FIG. 15C

DEMULTIPLEXING HIGH-ORDER TO LOW-ORDER ODU SIGNALS IN AN OPTICAL TRANSPORT NETWORK

CROSS REFERENCE TO RELATED APPLICATIONS

This application claims the benefit of priority of U.S. Provisional Patent Application No. 61/704,259 filed Sep. 21, 2012, which is incorporated herein by reference in its entirety.

FIELD

The present disclosure relates generally to optical data communications. More particularly, the present disclosure relates to demultiplexing in an optical transport network.

BACKGROUND

Bandwidth demand on telecommunications networks is increasing. In response, the International Telecommunications Union (ITU) has standardized the Optical Transport Network (OTN), which is a dense wavelength division multiplexing (DWDM) network. The rates and formats of OTN constructs such as optical channel transport unit (OTU)k and optical channel data unit (ODU)k are defined in ITU-T G.709.

ITU-T G.709 has a defined number of ODUk frames; k=0, 1, 2, 2e, 3 and 4, in order of increasing rates. A lower rate ODUj frame can be multiplexed into a higher rate ODUk frame. Multi-level multiplexing is allowed. For example, eight ODU0 streams may be multiplexed into an ODU2, which may, in turn, be multiplexed along with nine other ODU2 streams, into an ODU4. FIGS. 1A and 1B shows an OTN terminating device that supports two level of multiplexing.

The de-multiplexing of Lower Order (LO) ODUj/ODUflex clients from a High-Order (HO) ODUk carrier is also performed in two logical steps, De-multiplexing and Rate Justification. The De-multiplexing step extracts a set of ODTU streams, one for each LO ODUj, from the HO ODUk. The ODTU streams are phase locked to HO ODUk. The Rate Justification step recovers the rate of each LO ODUj in relation to its ODTU by decoding the AMP or GMP Justification Controls, as defined in ITU-T G.709. An example of de-multiplexing an ODU0, an ODU1 and an ODUflex.5 occupying five TribSlots from a High-Order ODU2 is shown in FIG. 2.

The individual LO channels are not frame aligned with the HO channel frame. Each LO channel is mapped in an ODTU which is a rate justified structure that fills the Tributary Slots allotted to the LO channel within the HO ODUk. The first byte of each LO ODTU is aligned with the HO ODUk Tributary Multiframe. Bytes of an ODTU are grouped into M-byte words, where M is the number of Tributary Slots (TribSlots) allocated to the ODTU. For identifying Data vs Stuff words in GMP, words are numbered using an index j. The first word is given j=1.

In a typical 100 Gbps bandwidth device, the datapath width (W) is typically W=32 to W=64 bytes. W is expected to grow for 400 Gbps and 1 Tbps bandwidth devices of the future. The number of Tributary Slots (M) allocated to a LO ODUk in the HO carrier varies. Some ITU-T G.709 values of M are as follows: ODU1: M=2; ODU2: M=8; ODU3: M=32; ODU4: M=80; and ODUflex: M=Variable.

FIGS. 3A and 3B show an ODU2 multiframe with three LO channels, an ODU0, ODU1 and ODUflex5. The Tributary Slots in the HO are split into a repeating sequence of LO TS allocated based on rate. ODU0=1 TS (Channel A), ODU1=2 TS (Channel B), and ODUflex5=5 TS (Channel C). The label within each byte shows the channel and the GMP byte count for the first word of each row.

When demultiplexing, the ODU overhead is removed and the resultant OPU (columns 17-3824) are demultiplexed into the Optical Channel Data Transport Units (ODTU). An ODTU2.1 is shown in FIG. 4 (channel A), ODTU12 in FIG. 5 (channel B) and ODTU2.5 in FIG. 6 (channel C).

LO clients can be added or removed from a HO carrier without affecting any other LO clients. In addition, in ITU-T G.7044, a LO ODUflex Generic Framing Procedure (GFP) channel can be hitlessly resized (up or down) without affecting any other LO clients.

GMP is a generic mapping procedure defined in ITU-T G.709. GMP is used to match the rate of the LO ODUj to the ODTU payload area. The ODTU bytes are then mapped into the OPUk Tributary Slots. Justification Control bytes in the GMP overhead specify the number of M-byte words in each ODTU frame that carry LO ODUj bytes (known as Data Words). The remaining words in the ODTU frame are filled with Stuff Words. The distribution of Data and Stuff words are given by Equations 1 and 2 below.

In Equation 1 and Equation 2, Cm is the number of client Data Words mapped into the payload area of the Server allocated to that client. Each M-byte word is indexed by j, where j=1 to Pm,server M-byte words. Pm,server is the number of words in the ODTU frame. A word is a client Data Word when Equation 1 is satisfied, and is a Stuff Word when Equation 2 is satisfied. An example of how Data and Stuff words may be distributed in an ODTU frame is shown in FIG. 7.

$$\text{client data } (D): \text{if } (j \times C_m) \bmod P_{m,server} < C_m \qquad \text{Equation 1}$$

$$\text{stuff } (S): \text{if } (j \times C_m) \bmod P_{m,server} \geq C_m. \qquad \text{Equation 2}$$

A known implementation of a demultiplexer follows the ITU-T G.709 definitions directly and is shown in FIG. 8. A set of HO ODUk carriers are delivered over a W-byte datapath in a TDM (time division multiplex) fashion. The incoming data is broadcast to a set of N demultiplex blocks, shown in FIG. 8 as Demultiplex0 to Demultiplex 79, one for each potential LO ODU client. For example, a HO ODU4 or a set of ten HO ODU2's can support up to 80 LO ODU0 clients. Each De-Multiplex block extracts bytes in the HO ODUk words that belong to the associated LO ODU client, and assembles them into W-byte words. The words are stored in separate ODTU FIFOs, shown in FIG. 8 as FIFO 0 to FIFO 79, one for each LO ODU client. The LO ODU client words contain both Data and Stuff bytes. A scheduler reads from each ODTU FIFO at a rate proportional to the number of Tributary Slots assigned to the LO ODU client. The words read from the ODTU FIFO is passed the GMP processor, shown in FIG. 8 as GMP Compactor, to identify Data and Stuff bytes. A typical implementation of the GMP Compactor or the GMP block is to first identify the GMP offset (j) of each byte and from that determine if it is a client data (D) or stuff (S), using Equation 1 and Equation 2. For a datapath width of W bytes, up to W decisions are required per clock cycle. The GMP Compactor block removes the Stuff bytes and the Word Maker constructs W-byte words of client data bytes.

As line rates go up, the container sizes increases but the granularity remains the same. A system can now have ODU4 carriers each with 80 Tributary Slots which results in large multiplexing structures with a huge number of potential combinations. The structure requires a large set of multiplexers, as well as a corresponding large set of demultiplexers, which need to be configured based on the datapath width (W) and the number of HO Tributary Slots. Further complicating the configuration is that the HO Tributary Slot number may not be divisible by the datapath width. The large number of LO TribSlots within the HO may mean that many cycles of the datapath are required before a single HO cycle is ready, resulting in multiple stages of storage.

An implementation should also be flexible to add or remove channels, or do ODUflex hitless resizing. This requires that the justification patterns can be changed on the fly and coordinated between the justification, multiplexing, demultiplexing, and justification removal stages. The data that is in FIFOs cannot be corrupted between justification contexts, and more importantly information pertaining to the context must pass through FIFOs.

It is, therefore, desirable to adjust provide an improved method and apparatus for demultiplexing high order ODUk to lower order ODUj signals in an optical transport network.

BRIEF DESCRIPTION OF THE DRAWINGS

Embodiments of the present disclosure will now be described, by way of example only, with reference to the attached Figures.

FIGS. 3A and 3B illustrate an example of TribSlot assignment of LO ODUj clients in a HO ODU2.

FIG. 4 illustrates an example of ODTU2.1.

FIG. 5 illustrates an example of ODTU12.

FIG. 6 illustrates an example of ODTU2.5.

FIG. 11 illustrates high-order OPUk datapath cycles according to an example embodiment of the present disclosure.

FIG. 12 illustrates low-order ODUj/ODUflex client datapath cycles according to an example embodiment of the present disclosure.

FIGS. 14A and 14B illustrate an S-T-S switch Buffer in RAM for ODU2 example with W=48 bytes (<CH><J>(byte#).<datapath cycle>) according to an example embodiment of the present disclosure.

FIGS. 15A, 15B, and 15C illustrate an S-T-S switch Buffer in RAM for ODU2 example with W=48 bytes with padding according to an example embodiment of the present disclosure.

DETAILED DESCRIPTION

Figure 1A:
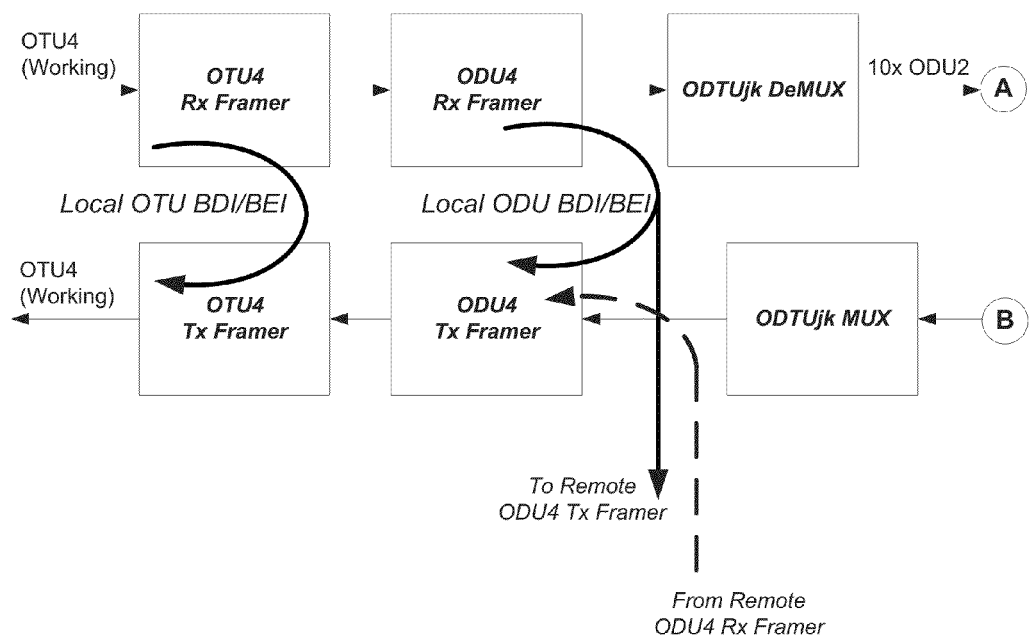
FIGS. 1A and 1B illustrate a typical OTN device with two levels of multiplexing.
Figure 1B:
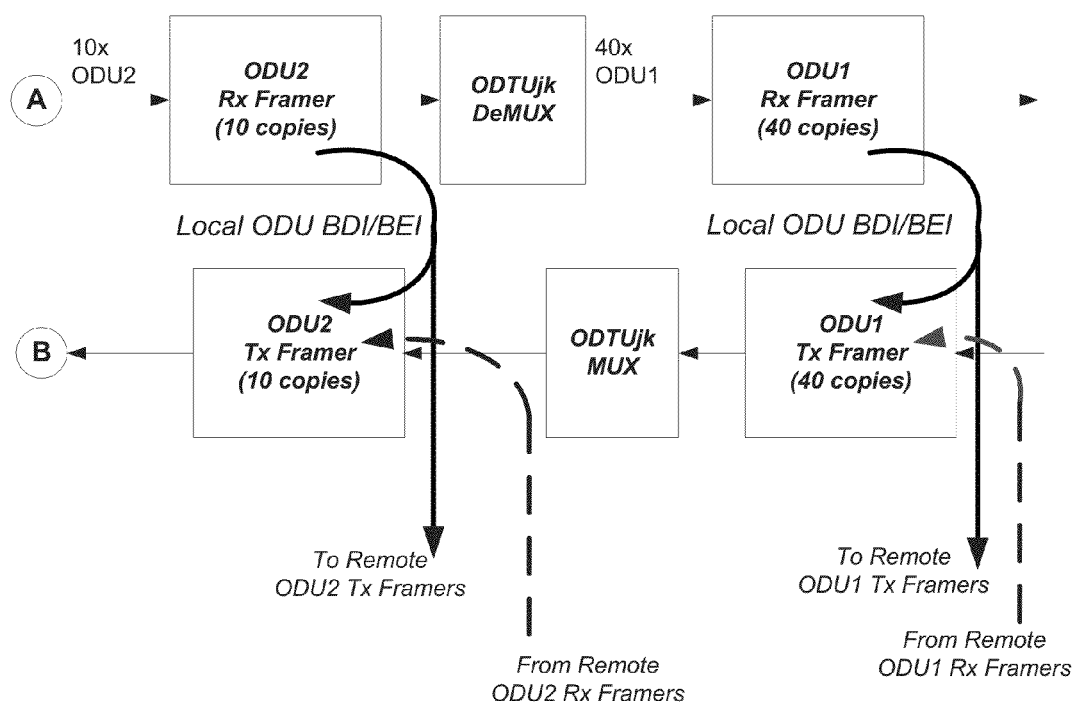
Figure 2:
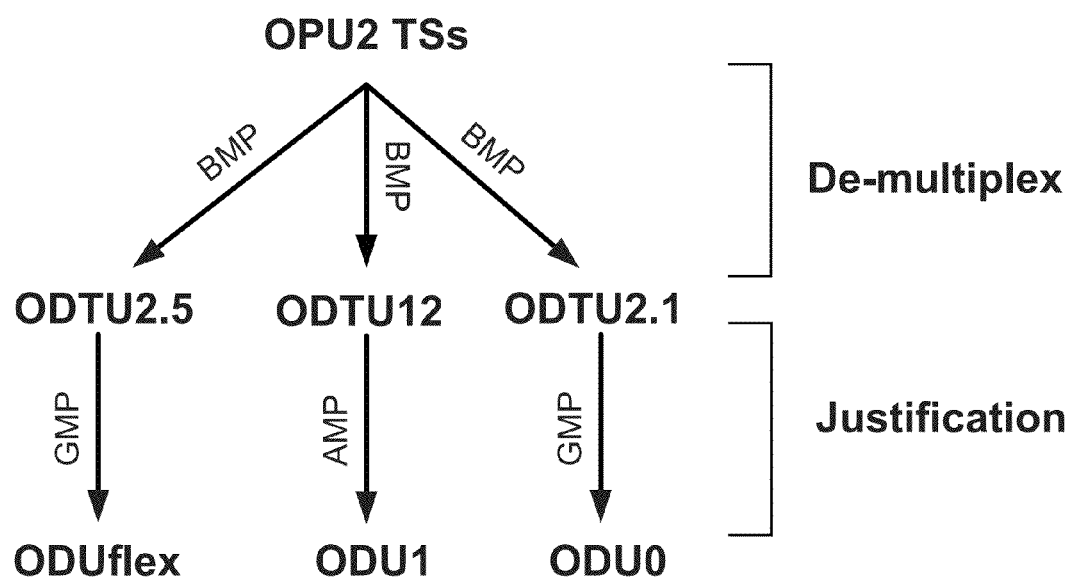
FIG. 2 illustrates an example of demultiplexing LO ODUj/ODUflex clients from a HO ODU2.
Figure 7:
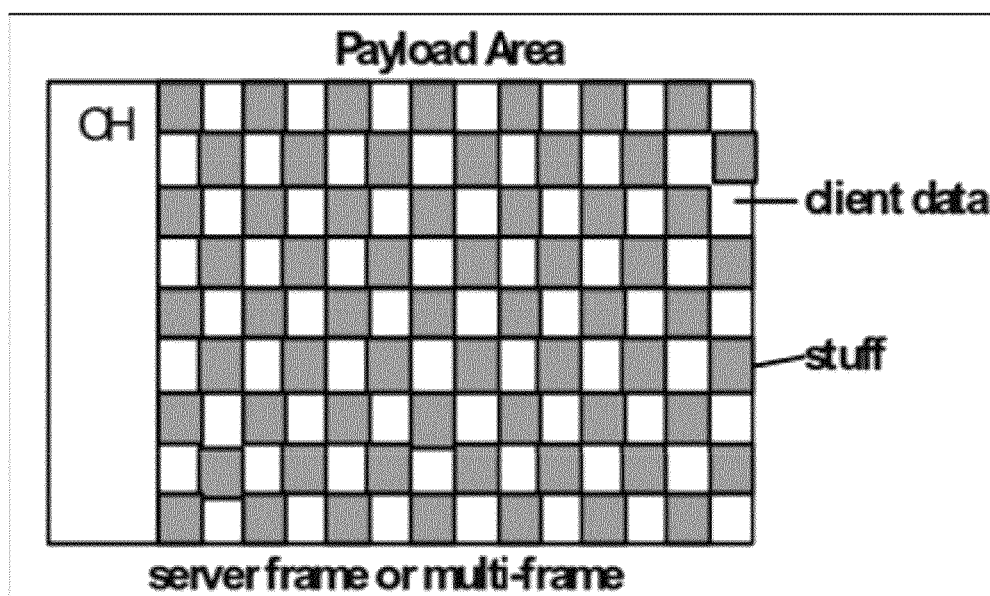
FIG. 7 illustrates distribution of data words and stuff words in an ODTU frame.
Figure 8:
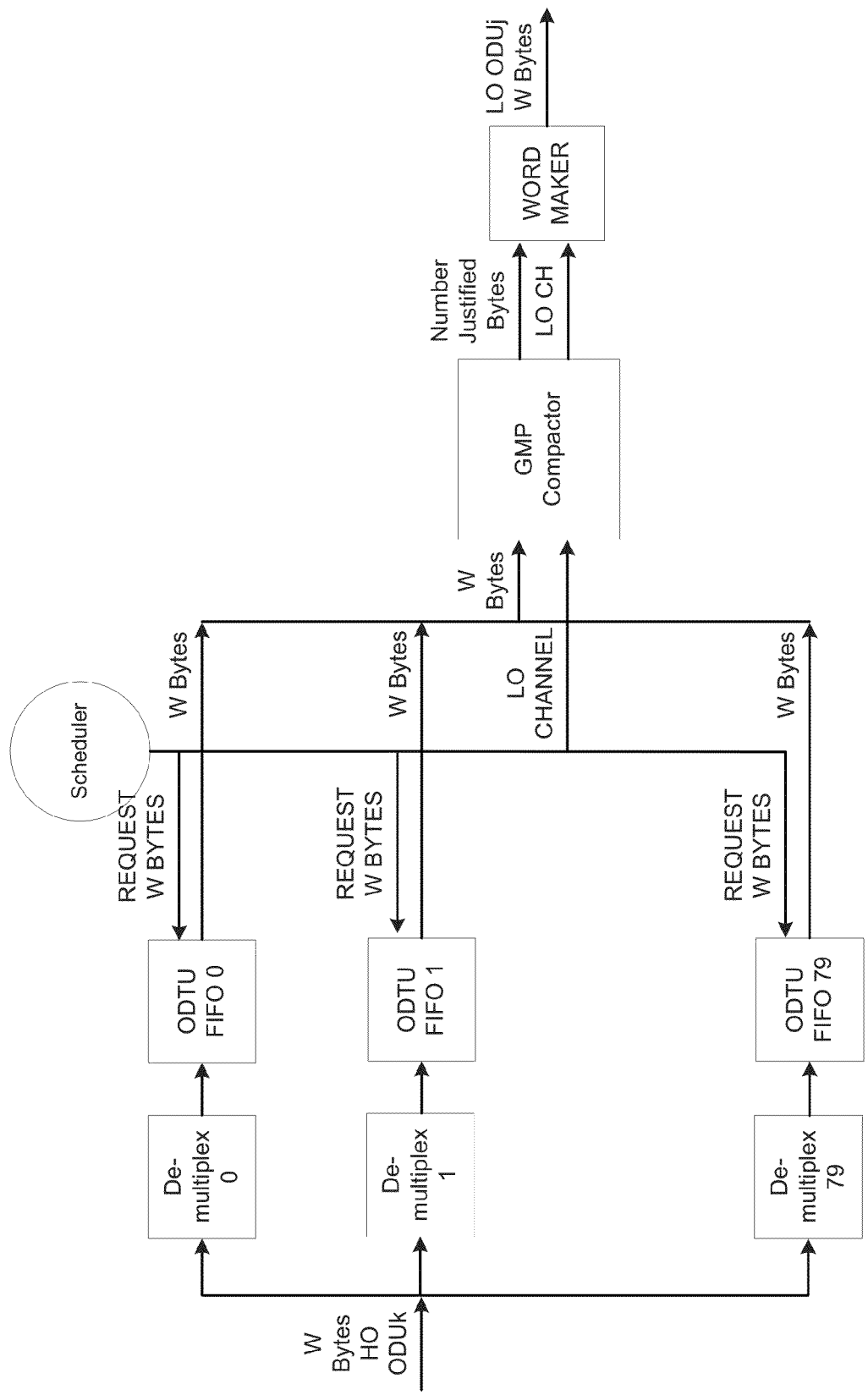
FIG. 8 illustrates a known implementation of an ODTUjk demultiplexer.

Generally, the present disclosure provides a method and apparatus for demultiplexing a High-Order (HO) ODUk into one or more Low-Order (LO) ODUj/ODUflex clients in an Optical Transport Network (OTN). LO bytes are demultiplexed in accordance with a tributary slot assignment for a selected LO ODUj of the HO ODUk stream using a permutation matrix. In an implementation, each byte on each ingress port of a W-port space-time-space switch is configurably assigned to an associated timeslot of an associated egress port, using time-division multiplexing. The number of TribSlots assigned to an ODUflex may be increased and decreased hitlessly. A Clos-like Space-Time-Space switch is used to interleave bytes from Low-Order ODUk words into High-Order ODUk words.

In an aspect, the present disclosure provides for a method of demultiplexing High-Order (HO) ODUk words into one or more Low-Order (LO) ODUj words in an Optical Transport Network (OTN). The method comprises extracting LO ODUj bytes that are interleaved in a received stream of W-byte HO ODUk words by separating the received stream of W-byte HO ODUk words into W LO ODUj egress streams, each LO ODUj egress stream corresponding to a grain-group having a grain-group length that matches a number of tributary slots allocated to the LO ODUj bytes in the received stream of W-byte HO ODUk words; and removing, using a compactor, stuff words from the LO ODUj words.

In an aspect, the present disclosure provides a method of demultiplexing a plurality of Low-Order (LO) ODUj clients from a High Order (HO) ODUk in an Optical Transport Network (OTN). The method comprises re-arranging and demultiplexing bytes from HO ODUk data words into a plurality of rate justified LO ODUj data words in accordance with a tributary slot assignment for a selected LO ODUj of the HO ODUk using a permutation matrix; and removing pad words among the plurality of rate justified LO ODUj data words, using a compactor block, such that only LO ODUj client data words remain.

In an example embodiment, the method further comprises: configurably assigning each byte on each ingress port of a W-port space-time-space switch to an associated timeslot of an associated egress port.

In an example embodiment, the re-arranged bytes comprise m bytes of the selected LO ODUj client when the selected LO ODUj client occupies m tributary slots in the HO ODUk.

In an example embodiment, the plurality of LO ODUj clients comprises LO ODUflex clients.

In an example embodiment, the compactor block removes generic mapping procedure (GMP) pad bytes, such that only GMP data bytes remain.

In an example embodiment, each GMP pad word and GMP data word occupies the same number of bytes as the number of HO ODUk tributary slots occupied by the LO ODUj stream.

In an example embodiment, the method further comprises reconfiguring the permutation matrix for additions or removals of LO ODUj/ODUflex clients within the HO ODUk carrier.

In an example embodiment, the method further comprises updating a standby page of configuration settings in the permutation matrix with new settings that take effect at a next server multi-frame boundary, ensuring that existing LO ODUj/ODUflex clients are hitless during a change.

In an example embodiment, removing the pad words comprises removing end of multiframe (EOMF) padding bytes that complete the final buffer of the permutation matrix for that multiframe, allowing for LO ODUj/ODUflex addition or removal of LO ODUj/ODUflex clients while remaining hitless on other LO ODUj/ODUflex clients.

In an aspect, the present disclosure provides a system for demultiplexing a plurality of Low-Order (LO) ODUj clients from a High Order (HO) ODUk in an Optical Transport Network (OTN). The system comprises a space-time-space (STS) switch including a permutation matrix for re-arranging and demultiplexing bytes from HO ODUk data words into a plurality of rate justified LO ODUj data words in accordance with a tributary slot assignment for a selected LO ODUj of the HO ODUk; and a compactor block for removing pad words among the plurality of rate justified LO ODUj data words, such that only LO ODUj client data words remain.

In an example embodiment, the STS switch comprises: a plurality of ingress multiplexers and a plurality of egress multiplexers implementing space stages of the STS switch; and a plurality of random access memories (RAMs) implementing a time stage of the STS switch, the RAMs configured to control the plurality of ingress multiplexers and the plurality of egress multiplexers.

In an example embodiment, for a W-byte HO ODUk cycle, a multiplexer selects one of 2*W×1 RAMs to store received HO ODUk data bytes.

In an example embodiment, for each received byte, the STS switch determines an egress word and a byte within the determined egress word on which the received byte will be sent out.

In an example embodiment, the STS switch comprises W ports, and configurably assigns each byte on each ingress port of the W-port STS switch to an associated timeslot of an associated egress port.

In an example embodiment, the re-arranged bytes comprise m bytes of the selected LO ODUj client when the selected LO ODUj client occupies m tributary slots in the HO ODUk.

In an example embodiment, the plurality of LO ODUj clients comprises LO ODUflex clients. There may be multiple or partial HO ODUk words within the datapath width ingress of the STS switch.

In an example embodiment, the compactor block removes generic mapping procedure (GMP) pad words among GMP data words.

In an example embodiment, each GMP pad word and GMP data word occupies the same number of bytes as the number of HO ODUk tributary slots occupied by the LO ODUj stream.

In an example embodiment, the STS switch is configured to demultiplex the plurality of HO ODUks into a plurality of LO ODUj clients, and the STS switch further comprises a set of permutation matrices comprising one permutation matrix for each of the plurality of HO ODUks.

In an example embodiment, the permutation matrix is reconfigurable for additions or removals of LO ODUj/ODUflex clients within a HO ODUk carrier.

In an example embodiment, the system further comprises a standby page of configuration settings in the permutation matrix, the standby page being updated with new settings that take effect at a next server multi-frame boundary, ensuring that existing LO ODUj/ODUflex clients are hitless during a change.

In an example embodiment, the compactor block removes end of multiframe (EOMF) padding bytes that complete the final buffer of the permutation matrix for that multiframe, allowing for LO ODUj/ODUflex addition or removal of LO ODUj/ODUflex clients while remaining hitless on other LO ODUj/ODUflex clients.

Other aspects and features of the present disclosure will become apparent to those ordinarily skilled in the art upon review of the following description of specific embodiments in conjunction with the accompanying figures.

Embodiments of the present disclosure provide an ODTUjk de-multiplexer. A related ODTUjk multiplexer is described in co-pending and commonly assigned application entitled "MULTIPLEXING LOW-ORDER TO HIGH-ORDER ODU SIGNALS IN AN OPTICAL TRANSPORT NETWORK", filed on even date herewith, which is incorporated herein by reference in its entirety.

In an example embodiment, an ODUjuk demux treats each byte of a W-byte bus carrying the LO ODUj client as a separate egress stream from the Space-Time-Space (STS) switch. The size of the switch grain-group is the number of Tributary Slots allocated to the LO ODUj stream in the HO ODUk as defined in ITU-T G.709. Each grain of the grain group can be independently configured to switch from an arbitrary STS switch output port to an arbitrary STS input port. Each grain in an egress grain group can be independently configured to switch to an arbitrary grain of an ingress grain group. The switch settings can only change at grain group boundaries. The grain size is one byte. A grain group consists of G bytes. The concept of grain groups is discussed in commonly assigned U.S. Pat. No. 7,492,760 entitled "Memory Egress Self Selection Architecture" issued on Feb. 17, 2009, which is incorporated herein by reference in its entirety.

In an example embodiment, an ODUjuk demux configures the W egress ports of the STS Switch to each output a byte of a W-byte word of the ODTU container of a LO ODUj/ODUflex client.

In an example embodiment, an ODUjuk demux maps the problem of de-multiplexing Low-Order ODUj/ODUflex clients from a High-Order ODUk carrier to that of assigning each byte on each ingress port of a W-port STS Switch to an associated timeslot of an associated egress port. The association of ingress bytes and ports to egress timeslots and ports is fully software configurable.

An ODUjk demux according to an example embodiment of the present disclosure comprises a RAM based implementation of the Time component of the STS switch and RAM based implementation for the control of the demultiplexers in the Space components of the STS switch. In an example embodiment of an ODUjuk demux, the Tributary Multiframe alignment of the HO ODUk is transferred across the STS Switch to allow the GMP demapper to extract LO Low-Order ODUj/ODUflex client bytes from its associated ODTU container by keeping J=1 matched with the start of the ODTU container.

Figure 9:
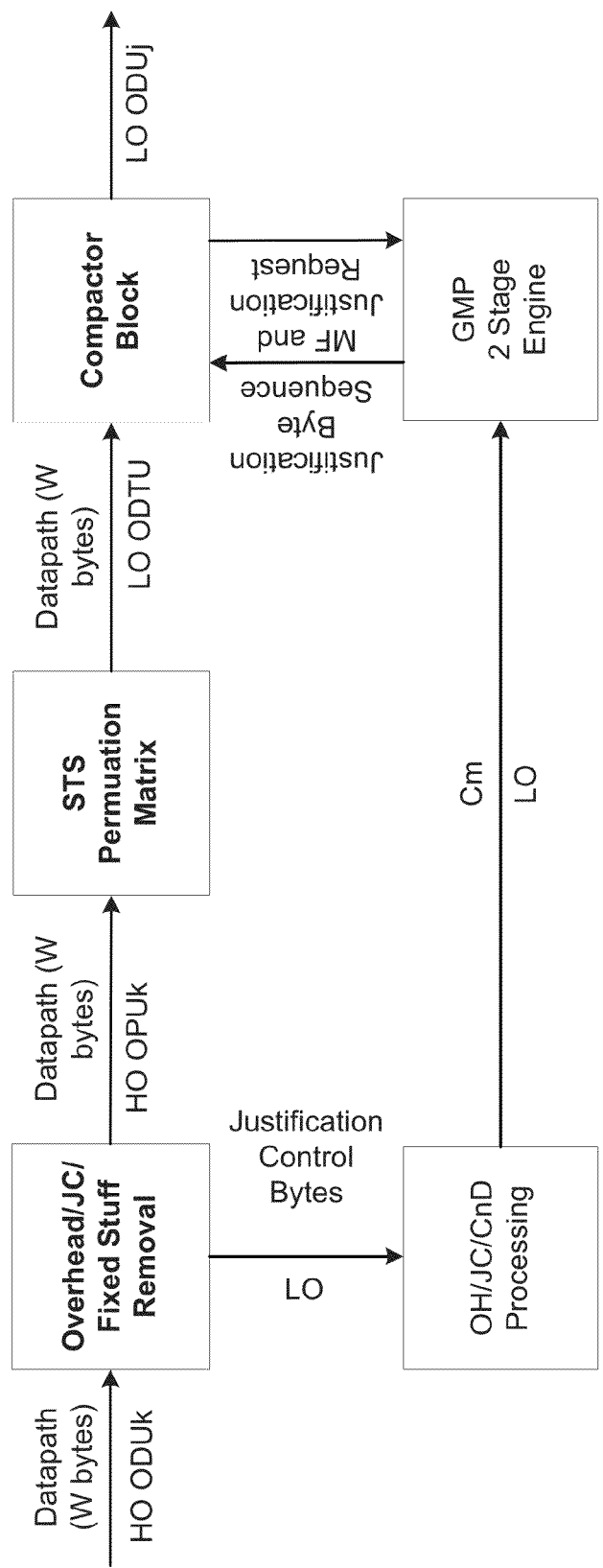
FIG. 9 illustrates an ODTUjk de-multiplexer according to an example embodiment of the present disclosure.

FIG. 9 shows an example of an ODTUjk demultiplexer according to an example embodiment of the present disclosure.

Figure 10:
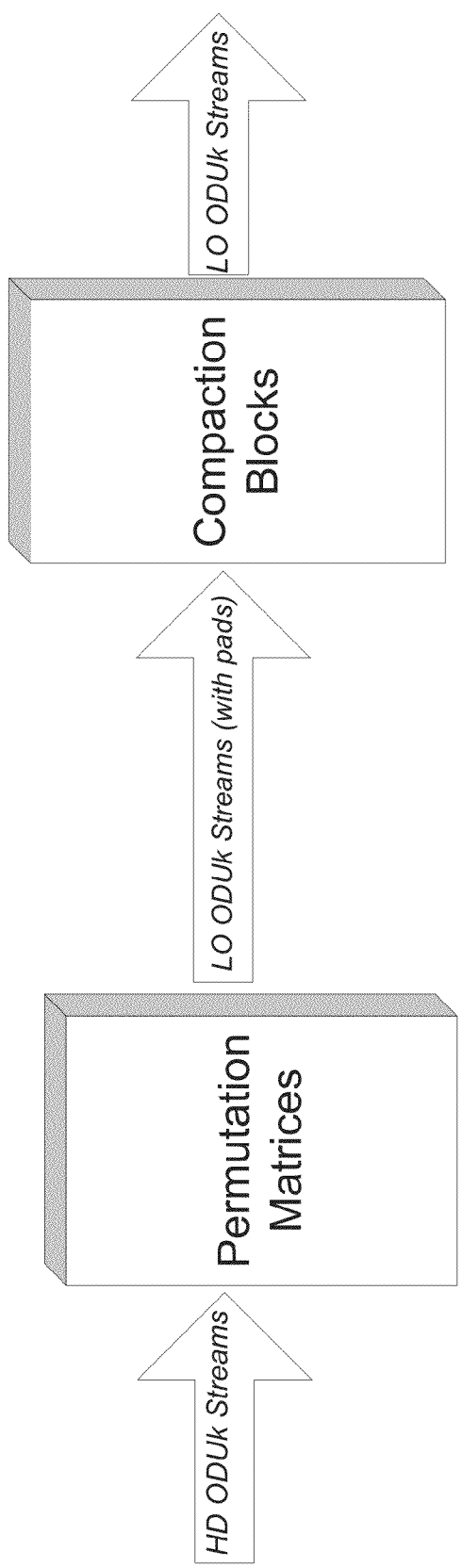
FIG. 10 illustrates an ODTU de-multiplexer and justification removal flow according to an example embodiment of the present disclosure.

FIG. 10 illustrates an ODTU demultiplexer and justification removal flow according to an example embodiment of the present disclosure. An implementation of the justification removal is described in co-pending and commonly assigned application entitled "JUSTIFICATION INSERTION AND REMOVAL IN GENERIC MAPPING PROCEDURE IN AN OPTICAL TRANSPORT NETWORK", filed on even date herewith, which is incorporated herein by reference in its entirety.

The demultiplexing of High-Order ODUk carriers into Low-Order ODUj/ODUflex clients comprises rearranging words from the High-Order ODUk words into bytes of the LO ODUj words. In an example embodiment, a set of Permutation Matrices, one for each HO ODUk, can be used for rearranging the words.

It can be shown that for a HO ODUk with T Tributary Slots, a block of T OPUk words (excluding Overhead, Fixed Stuff bytes) will contain an integer number of words of each constituent LO ODUj stream. That is, if LO ODUj #1 occupied $T_1$ TribSlots, LO ODUj #2 occupied $T_2$ TribSlots, etc., a block of $T=T_1+T_2+\ldots$ HO ODUk words will contain $T_1$ words of ODUj #1, $T_2$ words of ODUj #2, etc. This result is independent of the datapath width (W). The Permutation Matrix is used to rearrange a block of W×T bytes in arbitrary order. It is also known that a Clos Time-Space-Time switch, or its dual a Space-Time-Space switch, is able to arbitrarily switch the grains of N ingress streams, each with a grain-group length of G bytes, onto N egress stream.

Figure 13A:
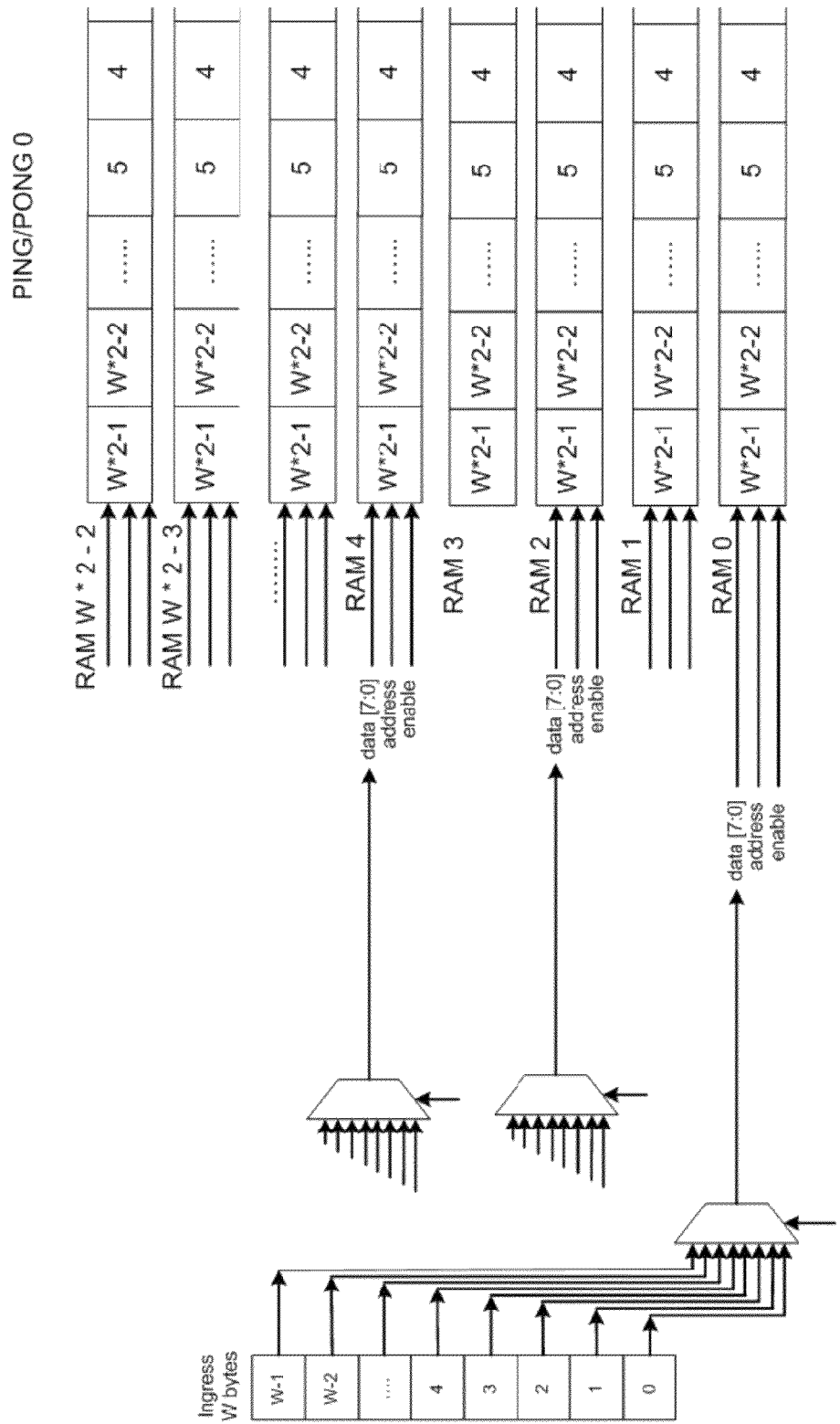
FIGS. 13A and 13B illustrate a multiplexer implementation for an S-T-S switch according to an example embodiment of the present disclosure.
Figure 13B:
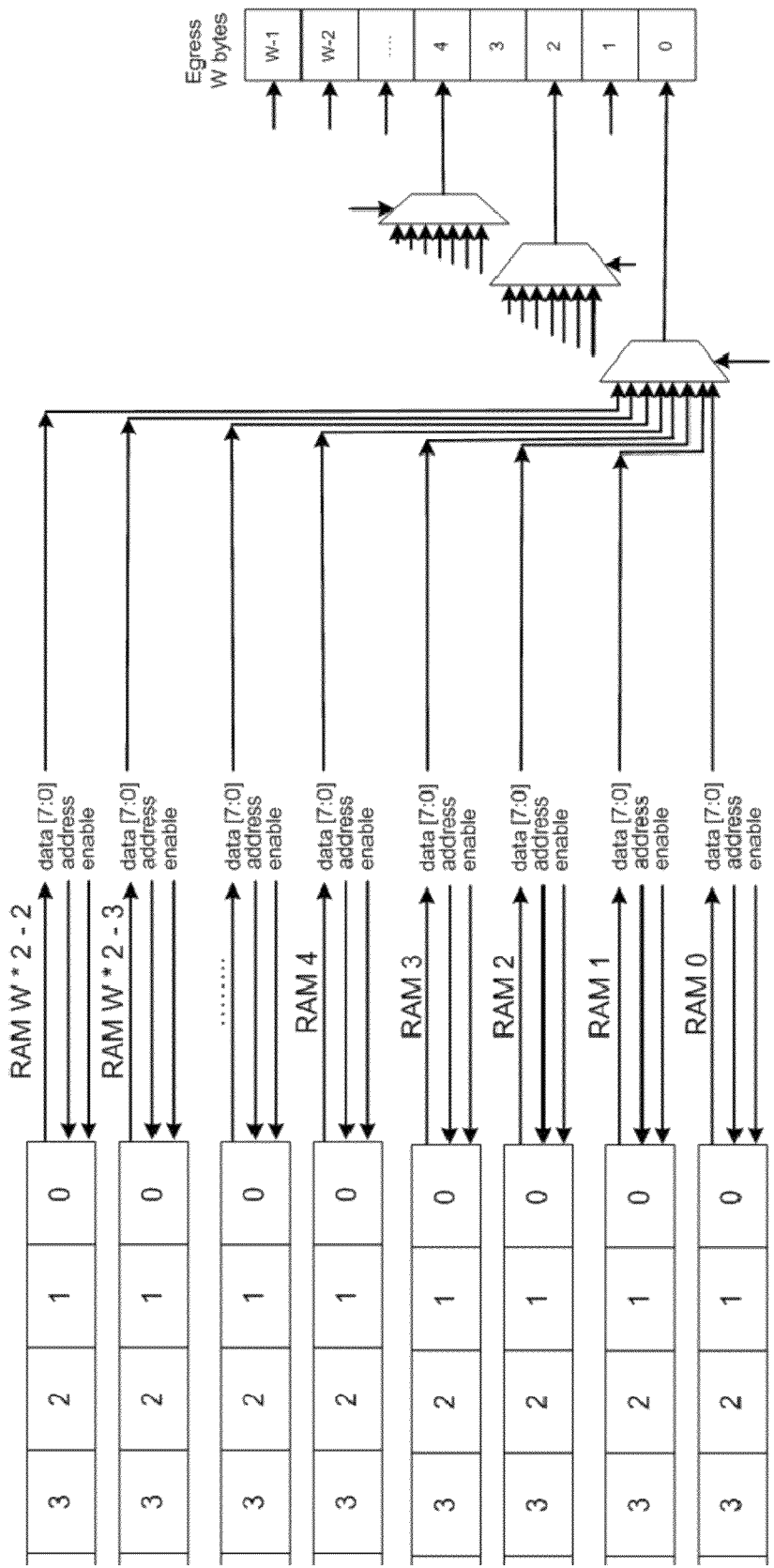

Advantageously, in an ODTU demultiplexer, the W-byte ingress HO ODUk stream word can be separated into W ingress streams. Each such stream has a grain-group length that matches the number of Tributary Slots (T) in the HO ODUk. A Clos switch can be used to implement the Permutation Matrix. FIGS. 13A and 13B illustrate a multiplexer implementation for an S-T-S switch according to an example embodiment.

Figure 14B:
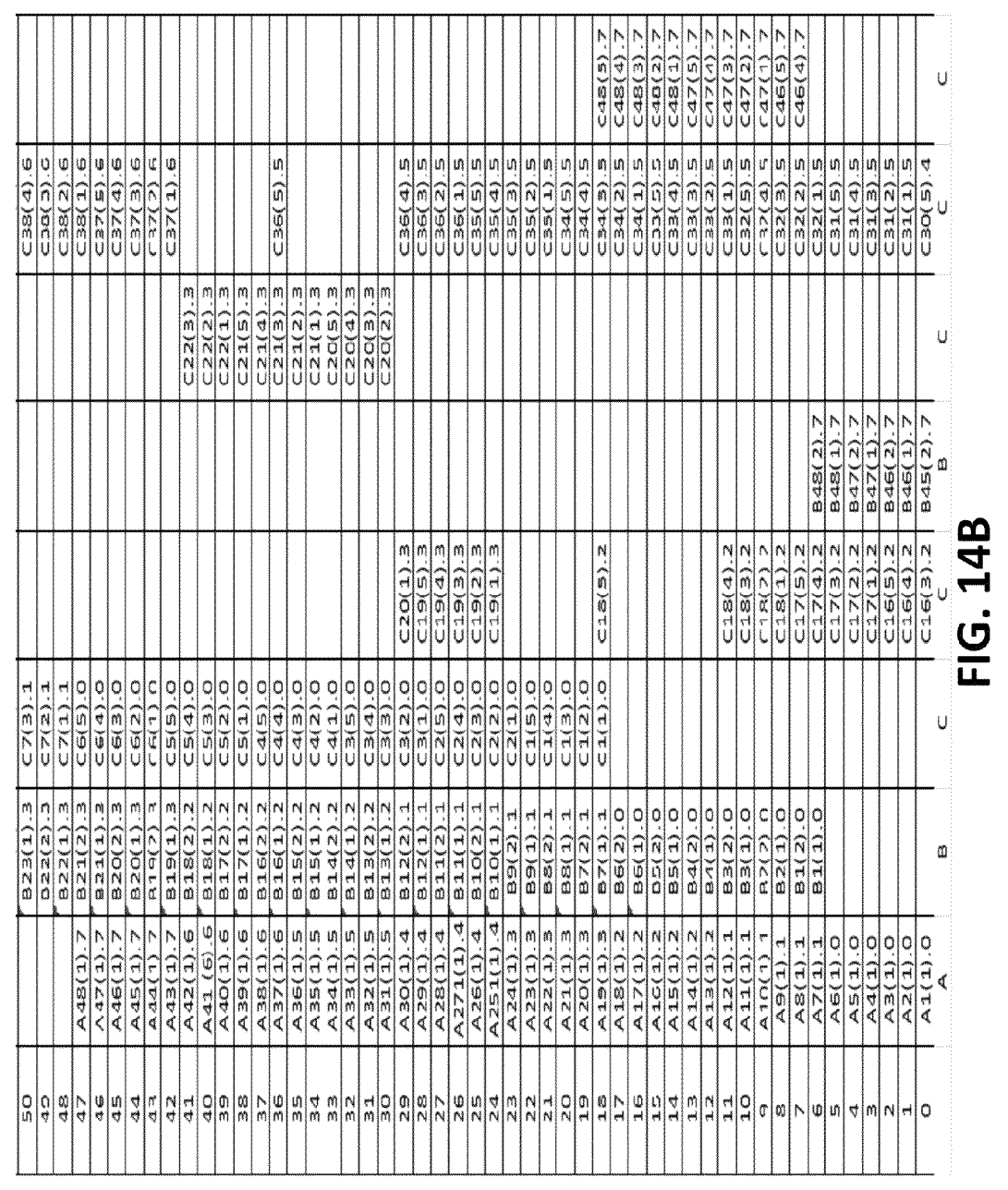

The datapath width (W) may be more or less than the number of Tributary Slots (T). The number of Tributary Slots of various ODUk streams are: ODU1: T=2; ODU2: T=8; ODU3: T=32; and ODU4: T=80. FIGS. 14A and 14B illustrate an S-T-S switch Buffer in RAM for ODU2 example with W=48 bytes (<CH><J>(byte#).<datapath cycle>) according to an example embodiment of the present disclosure. FIGS. 15A, 15B, and 15C illustrate an S-T-S switch Buffer in RAM for ODU2 example with W=48 bytes with padding according to an example embodiment of the present disclosure.

Consider the block of W×T bytes. Each byte is selectable as to which egress word and which byte of that egress word, it will be sent out on. In a Space-Time-Space implementation, each block occupies a range of T addresses in RAM. To be strictly non-blocking for unicast connections, a Clos switch requires a minimum of 2*W−1 RAMs as the Time stage. An ingress block of W×T bytes cannot be read out until it has been completely written into the RAMs. Thus, the RAMs must be deep enough to support 2*T addresses. In practice, to simplify ingress and egress timing domain alignment, the RAMs should be deep enough to support 4*T addresses. Thus, the 4 slices of addresses can act as a four element FIFO.

The interleaving only occurs within the High-Order OPUk, and therefore, the overhead, rows 1 to 16 must be removed first. FIG. 11 shows the datapath cycles with High-Order OPUk data words. The client words are shown based on j and denoting the byte number within the word.

In the High-Order to Low-Order direction, each HO ODUk cycle must have a write select for the W of the (W*2−1) RAMs it will write the W bytes. Each of the (W*2−1) RAMs also has a multiplexer to select which byte of the W bytes that will be written. The select may be software configurable. Additionally each RAM must have an independent address for the Permutation Matrix for the write operations.

At each LO ODUj cycle, all the RAMs share a common read address. All the RAMs can be read in unison, or a read select can be used to only enable the RAMs that are needed. Each of the egress W bytes needs to select which RAM to take the byte from through a multiplexer. The RAMs implement the time stage. The ingress and egress multiplexers implement the space stages.

The Permutation Matrix implementation is incredibly complex if done entirely in hardware. This includes the multiplexers and the multiplexer selects, RAM addresses, and RAM R/W enables for each cycle of the HO ODUk or LO ODUj. Hardware generation of these inputs is large, risky and difficult to fully test. According to an example embodiment of the present disclosure, firmware creates the configuration for the multiplexer selects, RAM addresses and RAM R/W enables. The firmware runs an algorithm that creates the Permutation Matrix settings based on the HO ODUk Tributary Slot allocation of the LO ODUjs within it. This configuration is based on cycles 1 to T for each HO ODUk carrier and corresponds to the matching LO ODUj/ODUflex clients. The configuration is programmed prior to the HO ODUk carrier activation.

The HO ODUk carrier Permutation Matrix operates on T cycles of W bytes. It buffers T cycles of W bytes from a set of LO ODUj/ODUflex clients. Each buffer is therefore based on a single High-Order carrier. In either HO to LO direction, a buffer cannot be read until it is completely written for all T cycles. For this reason, the Permutation Matrix contains multiple buffers to ensure that no overflow or underflow occurs. These multiple buffers act as a FIFO. The J=1 byte of the client ODTU is aligned to the start of a buffer.

The Permutation Matrix is reconfigured for additions or removals of LO ODUj/ODUflex clients within the HO ODUk carrier. A standby page of configuration settings is updated with the new settings and takes effect at the next Server Multi-frame boundary, ensuring that existing LO ODUj/ODUflex clients are hitless during this change. Each buffer can only contain data from a single HO ODUk multi-frame. The multi-frame boundary starts at an empty buffer and the last buffer, at the end of the multi-frame, is padded out. The amount of padding bytes needed is fixed for a given HO ODUk carrier, number of TribSlots T and databus width W.

The Permutation Matrix settings are reconfigured during ITU-T G.7044 hitless re-sizing of a LO ODUflex client. The entire HO ODUk carrier must be re-configured and uses a standby configuration that is programmed prior to the change-over (also known to a skilled person as a knife's edge, a term for when the number of TS used has changed in the permutation matrix). This change-over must also be hitless for all the existing, non-resized LO ODUflex clients. By restricting each buffer to only contain data from a single HO ODUk multi-frame and changing Permutation Matrix settings on multi-frame boundaries, the number of TribSlot allocated to each LO ODUj/ODUflex will be constant within the buffer.

An example embodiment of the present disclosure provides the de-multiplexing from a HO ODUk carrier and removal of justification to multiple LO ODUj/ODUflex clients as seen in FIG. 9. LO ODUj clients can be added or removed while other LO ODUj/ODUflex clients remain hitless during the operation. In ITU-T G.7044 ODUflex LO client resizing, the ODUflex channel being resized and other LO ODU clients are hitless.

In the example embodiment as shown in FIG. 9, the ODTU DeMUX performs de-multiplexing of the HO ODUk carrier into multiple LO ODTUjk/ODTUk.ts. The LO ODTUjk/ODTUk.ts streams are transformed into LO ODUj/ODUTflex clients by the removal of Justification bytes. The j=1 word of each LO ODTUjk/ODTUk.ts in the HO ODUk is identified and remain aligned within each multi-frame because of the end of multi-frame (EOMF) padding bytes that complete the last buffer of the STS Permutation Matrix in each multi-frame. This allows for LO addition or removal of LO ODUj/ODUflex clients while remaining hitless on other LO ODUj/ODUflex clients. The EOMF padding also allows for hitless ITU-T G.7044 ODUflex resizing. The stand-by configurations for the Permutation Matrix configuration settings and the GMP M expansion value at multi-frame boundaries as controlled from the Overhead Removal block. The buffers in the STS permutation matrix also produce latency on the data-path. The JC bytes translated into Cm by the OH/JC/CnD block are passed in parallel, and arrive ahead of the data going through the STS permutation matrix. A mailbox setup allows for simple aligned synchronization between the data and justification information between the Removal block and the GMP/Compactor blocks without the complexity of a FIFO for the JC bytes or the Cm values.

Figure 16:
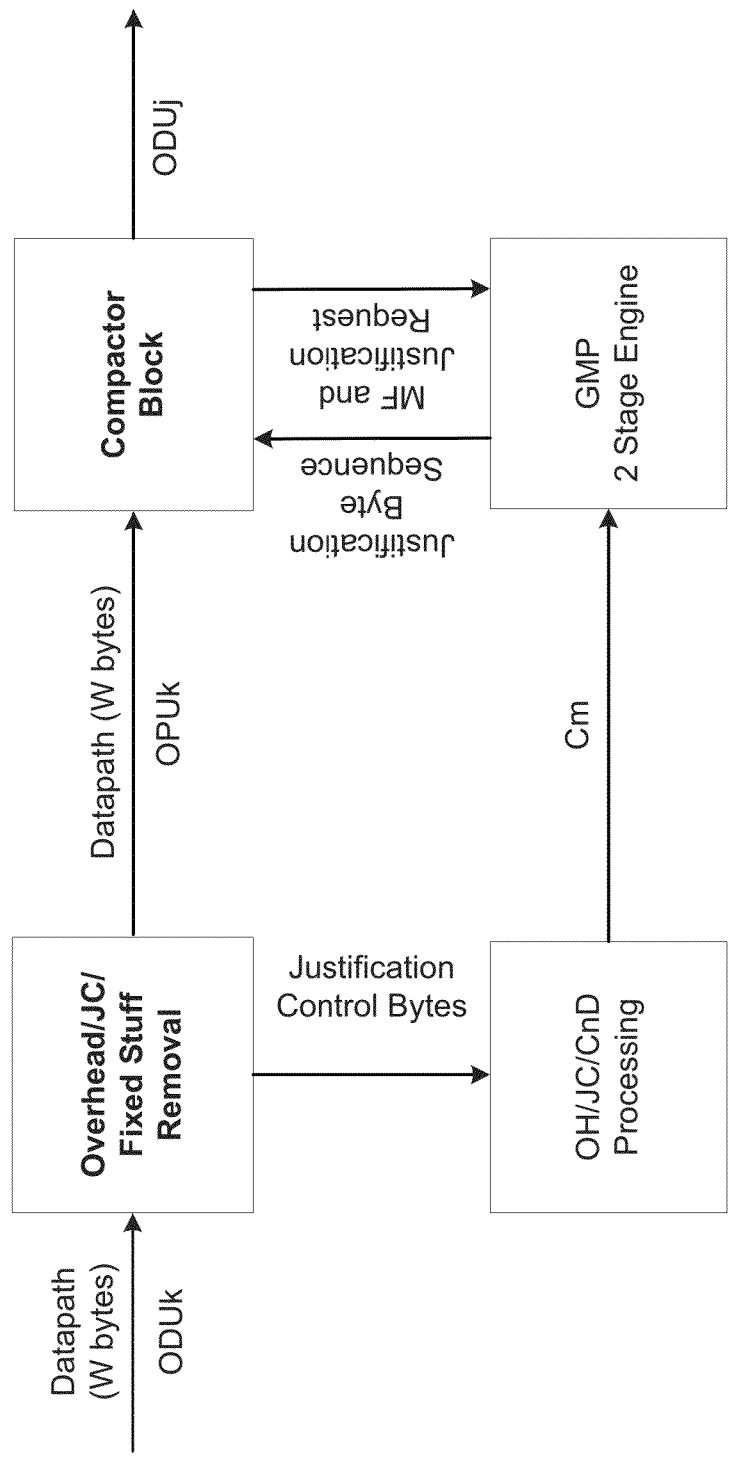
FIG. 16 illustrates ODUj de-mapping justification removal according to an example embodiment of the present disclosure.

A simplified example embodiment without the S-T-S switch is shown in FIG. 16, the ODUj DeMapper the justification is removed from ODUj/ODUflex clients into CBR traffic. The split in structure REMOVE (JC byte overhead removal) then STS (demultiplexing) allows reuse of the same hardware for a non-multiplexing solution where the STS is removed. These would be previous stages demapping LO OTN client streams with AMP, BMP, GMP mappings into non OTN client streams.

Embodiments of the present disclosure pertains to the field of optical data communications. In particular, embodiments of the present disclosure provide a novel approach to the Demultiplexing of HO ODUk carrier into Low-Order ODUj and ODUflex clients as defined in ITU-T G.709 and are applicable to hitless resizing of Low-Order ODUflex clients as defined in ITU-T G.7044. In another embodiment, a simplified version of the embodiments described herein can be used to demap ODUk carriers into Constant Bit Rate clients.

Example embodiments provide gate savings over a brute force approach that is linear of Order (N) proportional to the data rate. Such advantages are apparent in a 120G device, and will become increasingly apparent and valuable in 400 Gbps and 1 Tbps devices.

Embodiments of the present disclosure provide one or more of the following features or advantages:

DeMultiplexing LO channels from HO through software configurable multiplexing structure with RAM and a Space-Time-Space Switch;

Reduce hardware generated selects, reduces size;

Allows for RAM storage instead of register during demultiplexing, greatly reducing the size of the implementation;

Stand-by configuration allows for LO channel add/remove and LO ODUflex hitless resize;

EOMF padding keeps the MF context the same in a single buffer and keeps the Permutation Matrix aligned with LO ODTU justification; and Synchronization of justification, justification control bytes and multiplexing through TDM control address bits and mailbox simplified FIFO's.

Other example embodiments comprise:

a method to create a Permutation Matrix which reduces the hardware implementation size;

a method to change the Permutation Matrix for LO channel add/remove hitless on other LO channels;

a method to change the Permutation Matrix for LO ODUflex resize while remaining hitless on that channel;

a method to coordinate justification and demultiplexing patterns;

a method to synchronize justification control bytes and multiplexing; and a method to synchronize latency, mailbox.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of demultiplexing a plurality of Low-Order (LO) Optical Channel Data Unit-j (ODUj) clients from a High-Order (HO) Optical Channel Data Unit-k (ODUk) in an Optical Transport Network (OTN), the method comprising:

re-arranging and demultiplexing bytes from HO ODUk data words into a plurality of rate justified LO ODUj data words in accordance with a tributary slot assignment for a selected LO ODUj of the HO ODUk using a permutation matrix; and removing pad words among the plurality of rate justified LO ODUj data words, using a compactor block, such that only LO ODUj client data words remain.

2. The method of claim 1, further comprising:

configurably assigning each byte on each ingress port of a W-port space-time-space (STS) switch to an associated timeslot of an associated egress port, wherein the STS switch comprises W ports, where W is a positive integer.

3. The method of claim 1, wherein the re-arranged bytes comprise m bytes of the selected LO ODUj client when the selected LO ODUj client occupies m tributary slots in the HO ODUk.

4. The method of claim 1, wherein the plurality of LO ODUj clients comprises LO ODUflex clients.

5. The method of claim 1, wherein the compactor block removes generic mapping procedure (GMP) pad bytes, such that only GMP data bytes remain.

6. The method of claim 5, wherein each GMP pad word and GMP data word occupies the same number of bytes as the number of HO ODUk tributary slots occupied by the LO ODUj stream.

7. The method of claim 1, further comprising reconfiguring the permutation matrix for additions or removals of LO ODUj/ODUflex clients within the HO ODUk carrier.

8. The method of claim 1, further comprising updating a standby page of configuration settings in the permutation matrix with new settings that take effect at a next server multi-frame boundary, ensuring that existing LO ODUj/ODUflex clients are hitless during a change.

9. The method of claim 1, wherein removing the pad words comprises removing end of multiframe (EOMF) padding bytes that complete the final buffer of the permutation matrix for that multiframe, allowing for LO ODUj/ODUflex addition or removal of LO ODUj/ODUflex clients while remaining hitless on other LO ODUj/ODUflex clients.

10. A system for demultiplexing a plurality of Low-Order (LO) Optical Channel Data Unit-j (ODUj) clients from a High-Order (HO) Optical Channel Data Unit-k (ODUk) in an Optical Transport Network (OTN) comprising:
   a space-time-space (STS) switch including a permutation matrix for re-arranging and demultiplexing bytes from HO ODUk data words into a plurality of rate justified LO ODUj data words in accordance with a tributary slot assignment for a selected LO ODUj of the HO ODUk; and
   a compactor block for removing pad words among the plurality of rate justified LO ODUj data words, such that only LO ODUj client data words remain.

11. The system of claim 10, wherein the STS switch comprises:
   a plurality of ingress multiplexers and a plurality of egress multiplexers implementing space stages of the STS switch; and
   a plurality of random access memories (RAMs) implementing a time stage of the STS switch, the RAMs configured to control the plurality of ingress multiplexers and the plurality of egress multiplexers.

12. The system of claim 11, wherein, for a W-byte LO ODUj cycle, a multiplexer selects one of 2*W−1 RAMs to store received LO ODUj data words.

13. The system of claim 10, wherein, for each received byte, the STS switch determines an egress word and a byte within the determined egress word on which the received byte will be sent out.

14. The system of claim 13, wherein the STS switch comprises W ports, where W is a positive integer, and configurably assigns each byte on each ingress port of the W-port STS switch to an associated timeslot of an associated egress port.

15. The system of claim 10, wherein the re-arranged bytes comprise m bytes of the selected LO ODUj client when the selected LO ODUj client occupies m tributary slots in the HO ODUk.

16. The system of claim 10, wherein the plurality of LO ODUj clients comprises LO ODUflex clients.

17. The system of claim 10, wherein the compactor block removes generic mapping procedure (GMP) pad words, such that only GMP data words remain.

18. The system of claim 17, wherein each GMP pad word and GMP data word occupies the same number of bytes as the number of HO ODUk tributary slots occupied by the LO ODUj stream.

19. The system of claim 10, wherein the STS switch is configured to demultiplex the plurality of HO ODUks to a plurality of LO ODUj clients, the STS switch further comprising a set of permutation matrices comprising one permutation matrix for each of the plurality of HO ODUks.

20. The system of claim 10, wherein the permutation matrix is reconfigurable for additions or removals of LO ODUj/ODUflex clients within a HO ODUk carrier.

21. The system of claim 10, further comprising a standby page of configuration settings in the permutation matrix, the standby page being updated with new settings that take effect at a next server multi-frame boundary, ensuring that existing LO ODUj/ODUflex clients are hitless during a change.

22. The system of claim 10, wherein the compactor block removes end of multiframe (EOMF) padding bytes that complete the final buffer of the permutation matrix for that multiframe, allowing for LO ODUj/ODUflex addition or removal of LO ODUj/ODUflex clients while remaining hitless on other LO ODUj/ODUflex clients.

\* \* \* \* \*